United States Patent [19]

Dopp et al.

[11] Patent Number: 5,606,373
[45] Date of Patent: Feb. 25, 1997

[54] METHODS FOR REPEATED FIELD DETECTION

[75] Inventors: Cecelia L. Dopp, Austin, Tex.; Charlene A. Gebler, Vestal, N.Y.; Cesar A. Gonzales, Katonah, N.Y.; Elliot N. Linzer, Bronx, N.Y.; Agnes Y. Ngai, Endwell, N.Y.; Prasoon Tiwari, Croton-on-Hudson, N.Y.; Eric Viscito, San Francisco, Calif.

[73] Assignee: International Business Machines Corporation, Armonk, N.Y.

[21] Appl. No.: 418,720

[22] Filed: Apr. 4, 1995

[51] Int. Cl.$^6$ ....................................................... H04N 7/01
[52] U.S. Cl. .......................................... 348/459; 348/558
[58] Field of Search .................................. 348/558, 526, 348/449, 459, 699, 700, 607, 720; H04N 2/21

[56] References Cited

U.S. PATENT DOCUMENTS

| | | | |
|---|---|---|---|
| 4,485,403 | 11/1984 | Illetschko | 348/607 |
| 4,652,907 | 3/1987 | Fling | 348/620 |
| 4,982,280 | 1/1991 | Lyon et al. | 348/558 |
| 4,987,489 | 1/1991 | Harley et al. | 348/459 |
| 5,406,333 | 4/1995 | Martin | 348/449 |
| 5,412,435 | 5/1995 | Nakajima | 348/699 |

*Primary Examiner*—Victor R. Kostak
*Attorney, Agent, or Firm*—Richard M. Ludwin

[57] ABSTRACT

A system and method for repeat field detection for use in rate conversion and video encoding of the type contemplated by the MPEG standards. Before encoding a frame, first field in the current frame is compared to the previously occurring field of the same parity. Next, a single number (the inter-field parameter) is generated, which is a measure of the difference between the two fields. If the inter-field parameter is below a threshold a signal is generated to indicate that the current field is a repeat of the previous field of the same parity. Otherwise, the signal is generated to indicate that the field is not a repeat of the previous field of the same parity (i.e. the field likely contains at least one small area of motion).

12 Claims, 8 Drawing Sheets

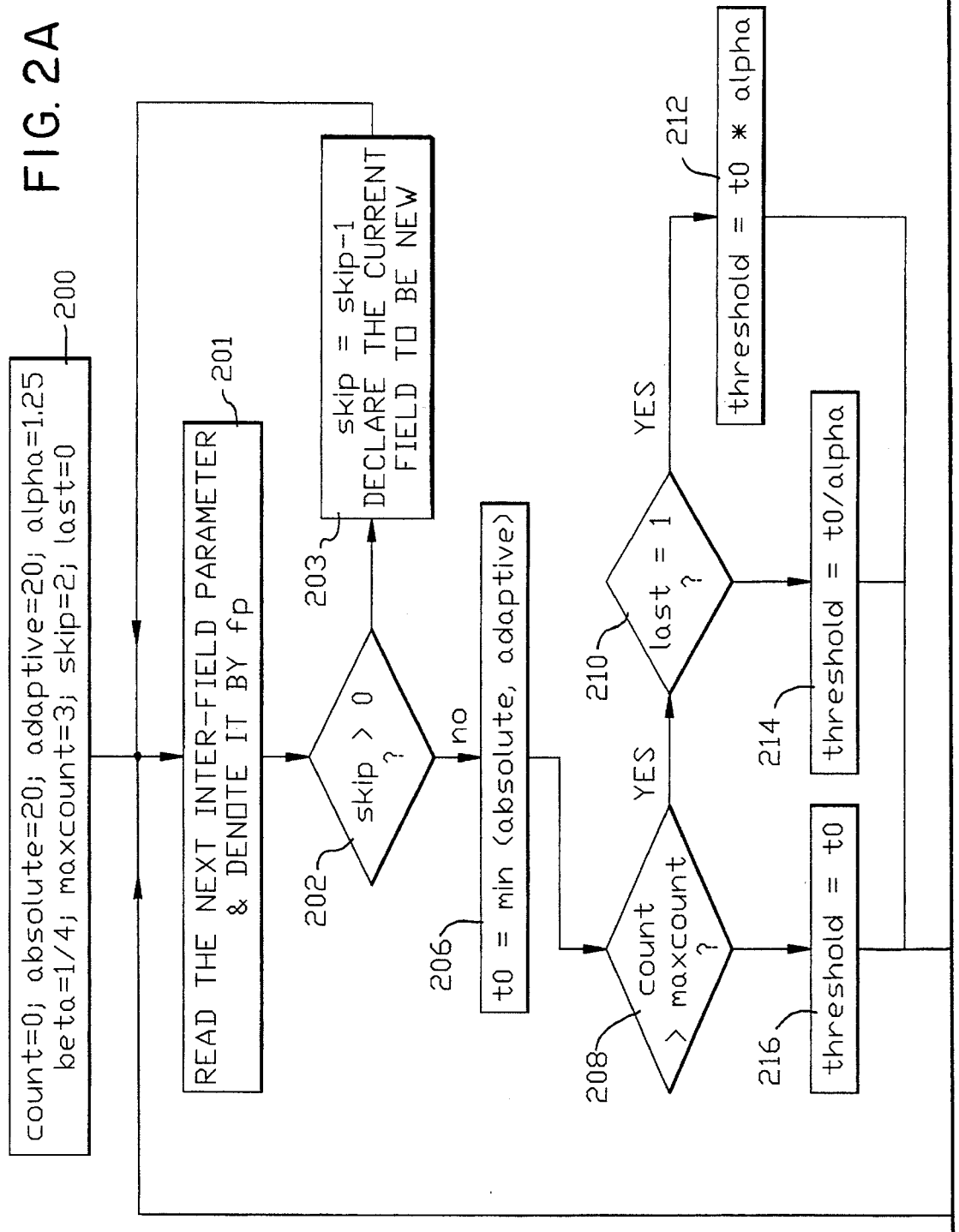

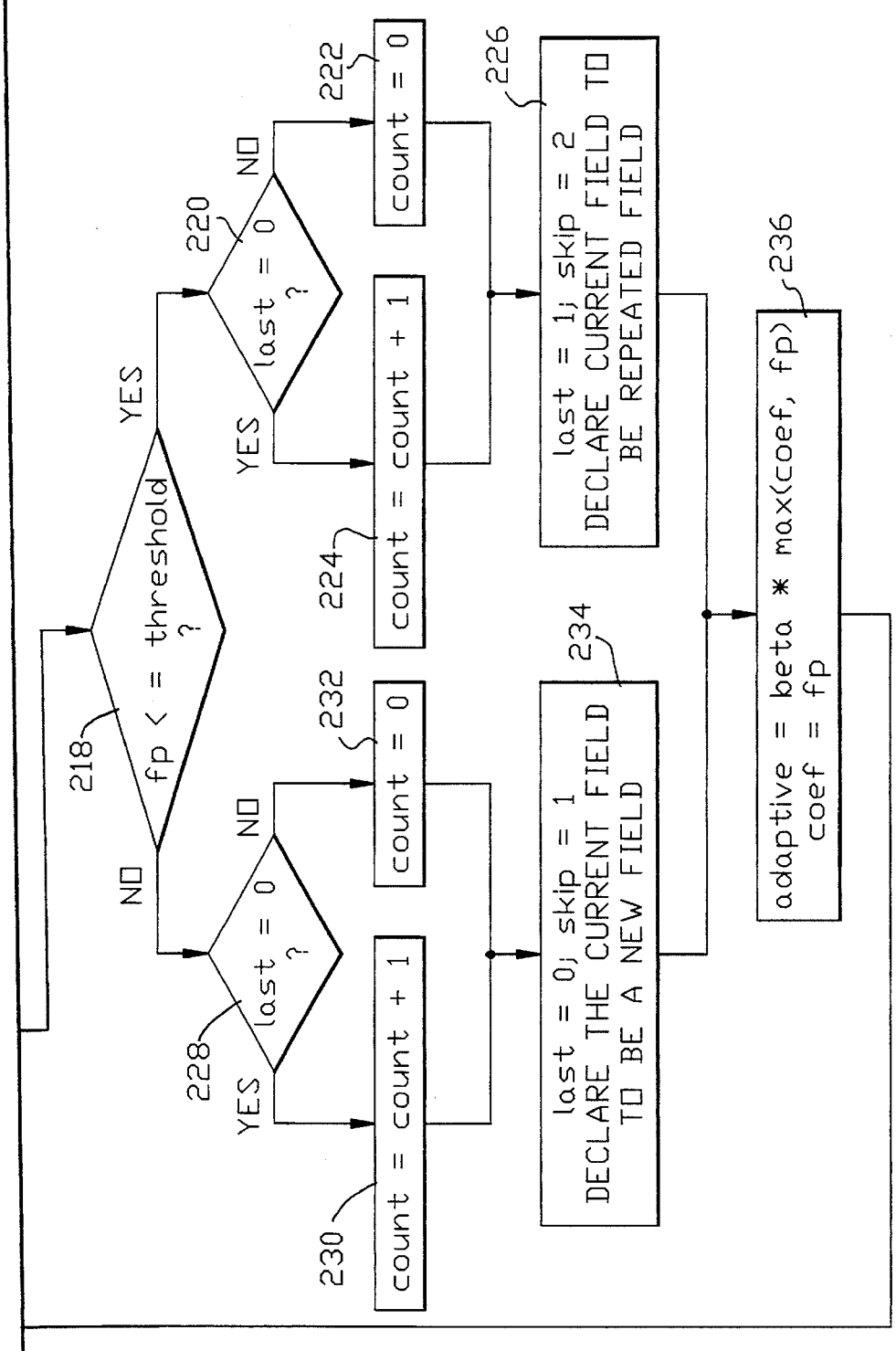
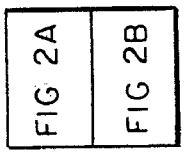
FIG. 2B
FIG. 2
| FIG. 2A |
| FIG. 2B |

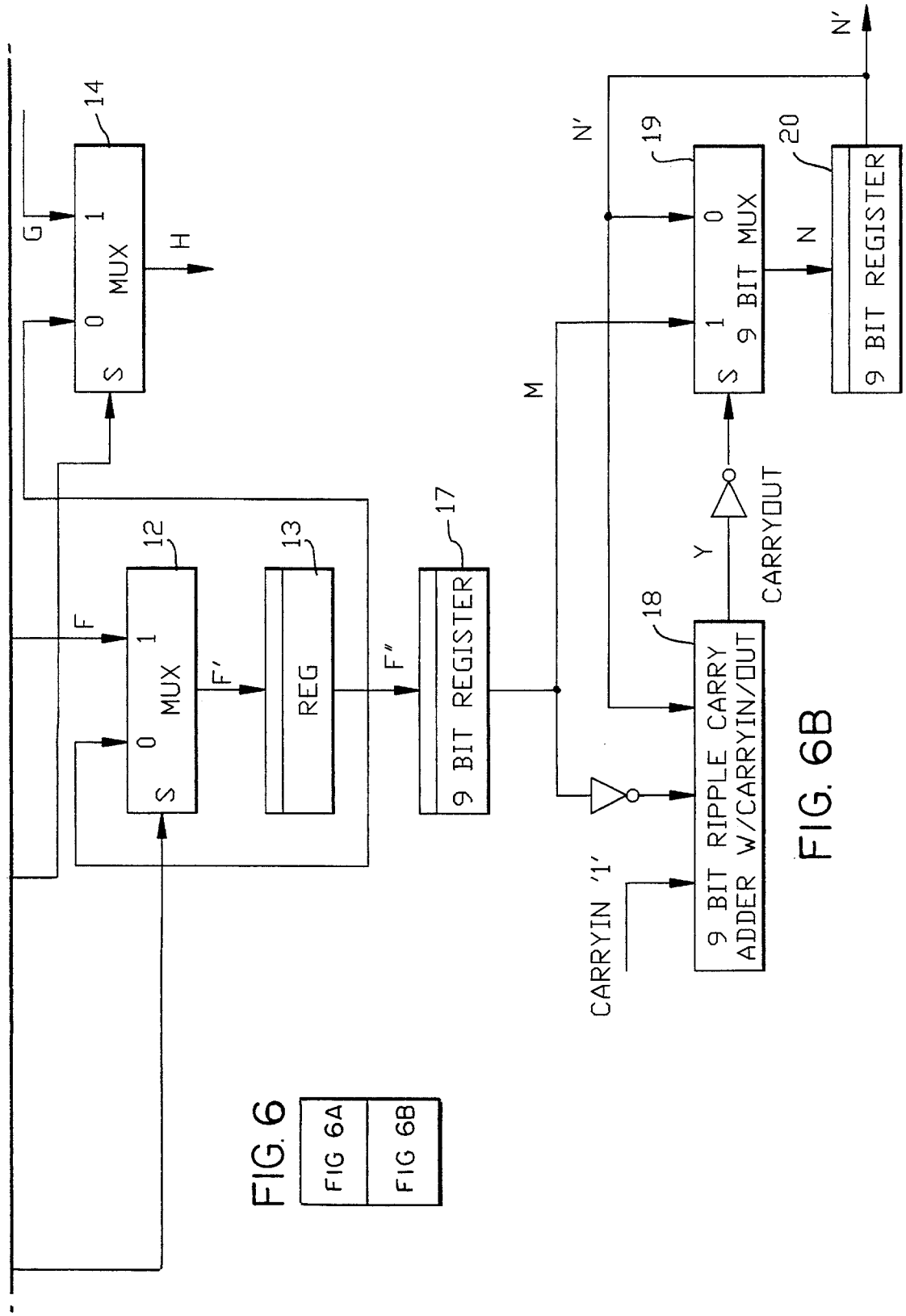

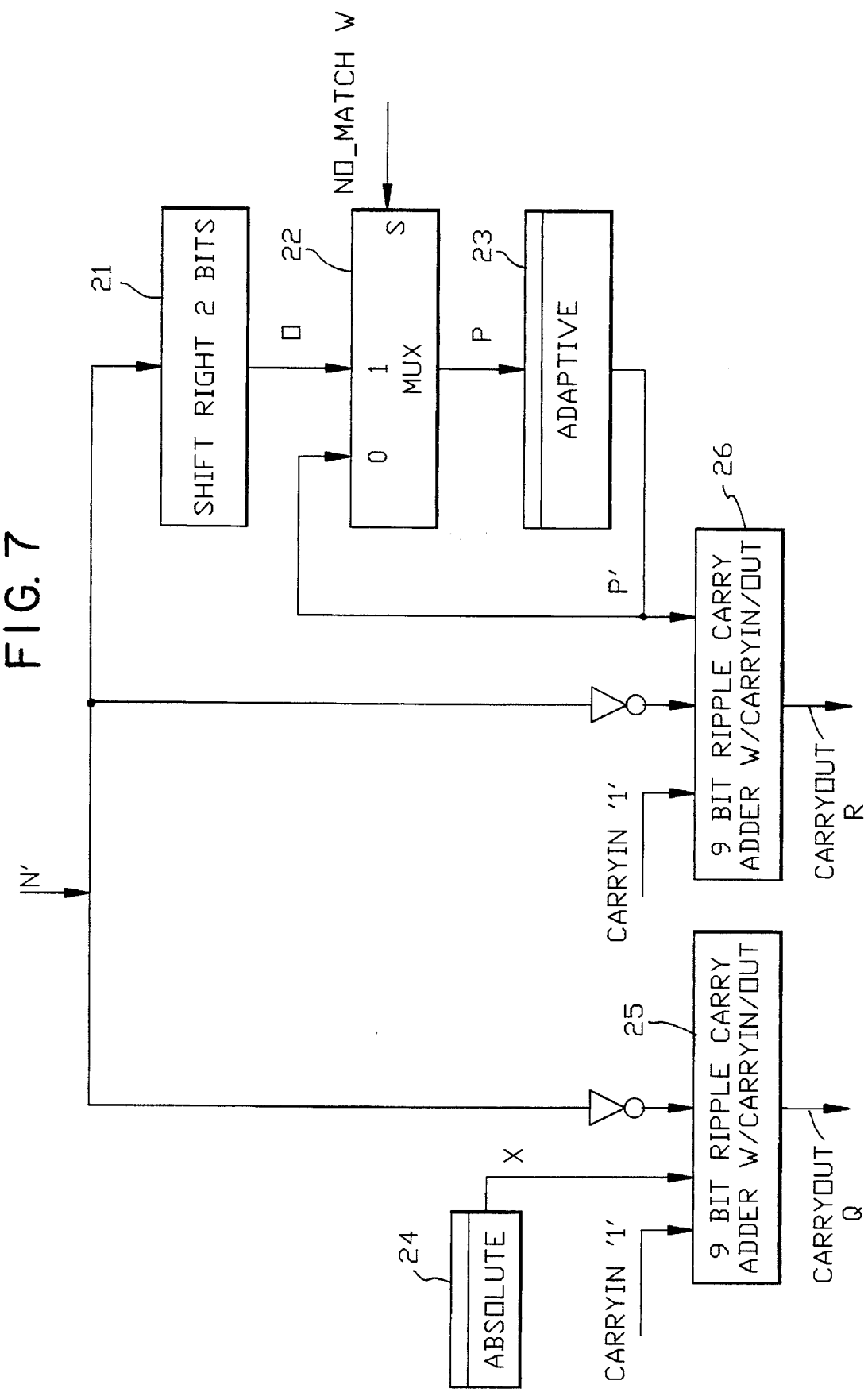

METHODS FOR REPEATED FIELD DETECTION

BACKGROUND OF THE INVENTION

1. Field of the Invention

The present invention relates to the field of display rate-conversion and, more particularly, to a system and techniques for detecting repeated fields in video data.

2. Related Art

With the increasing deployment of digital video systems, there is a growing demand for the conversion of film material to video. The display in 60 fields/second video format of moving pictures which originated on 24 frames/second film presents a problem of adjusting the picture display rate. This is usually accomplished by a technique known as 3:2 pulldown, described below, in which video fields are created from the appropriate lines of the most recent film frame.

Denote by A, B, C, and D, four consecutive frames from a film. Each frame consists of a certain number of lines which are numbered starting at zero. The top (even) and the bottom (odd) field of a frame consists of the even and odd numbered lines, respectively. Denote by A0, B0, C0, D0 and A1, B1, C1, D1 the top and the bottom fields of frames A, B, C, and D, respectively. Thus, in terms of its fields, frame A consists of two fields, A0 and A1 (denoted by A0/A1). Application of 3:2 pulldown to the sequence A, B, C, D produces A0/A1, B0/B1, B0/C1, C0/D1, D0/D1.

The 3:2 pulldown is normally used in the film-to-tape transfer process, i.e., while transferring 24 frames/second film material to 60 fields/second video tape. The process ordinarily results in a periodic pattern of repeated fields, which are identical to the previous field of the same parity except for noise introduced in the film-to-tape transfer process. In the MPEG-2 video compression standard, a mechanism is available for signalling that such a repeated field exists in the source. When an encoder detects that a particular field is repeated it sends information used to reconstruct that field only once, so bits which would otherwise be used to transmit redundant information can be used to improve the overall reconstructed quality of the sequence. Moreover, after the 3:2 pulldown has been inverted each frame that the encoder transmits contains two fields from a single time instant; the frame is non-interlaced. Encoding and pre-processing (e.g., noise reduction filtering) may be more effective on the recovered non-interlaced source than on the interlaced version. The MPEG-2 standard does not specify how to determine whether a field is repeated.

Thus a general problem in the field of video rate conversions is how to best detect when a field is "identical" to the next field of the same parity, within the limits of the film-to-tape transfer process.

SUMMARY OF THE INVENTION

In light of the above, the present invention includes a system and method for improved repeat field detection. Before encoding a frame, a first field in the current frame is compared to a previously occurring field of the same parity. An inter-field parameter is generated, which is a measure of the difference between the two fields. If the inter-field parameter is below a threshold a signal is generated to indicate that the current field is a repeat of a previous field. Otherwise, the signal indicates that the field is not a repeated field (i.e. the field likely contains at least one small area of motion).

BRIEF DESCRIPTION OF THE DRAWING

The invention will be better understood by reference to the drawing, wherein:

FIG. 2 is flow chart of the operation of the Threshold Detector of FIG. 3;

DETAILED DESCRIPTION OF THE PREFERRED EMBODIMENTS

An overview of repeat field detection according to an embodiment of the present invention is as follows: Before encoding a frame, first field in the current frame is compared to the previously occurring field of the same parity. Next, a single number (the inter-field parameter) is generated, which is a measure of the difference between the two fields. If the inter-field parameter is below a threshold a signal is generated to indicate that the current field is a repeat of the previous field of the same parity. Otherwise, the signal is generated to indicate that the field is not a repeat of the previous field of the same parity (i.e. the field likely contains at least one small area of motion).

Figure 3:
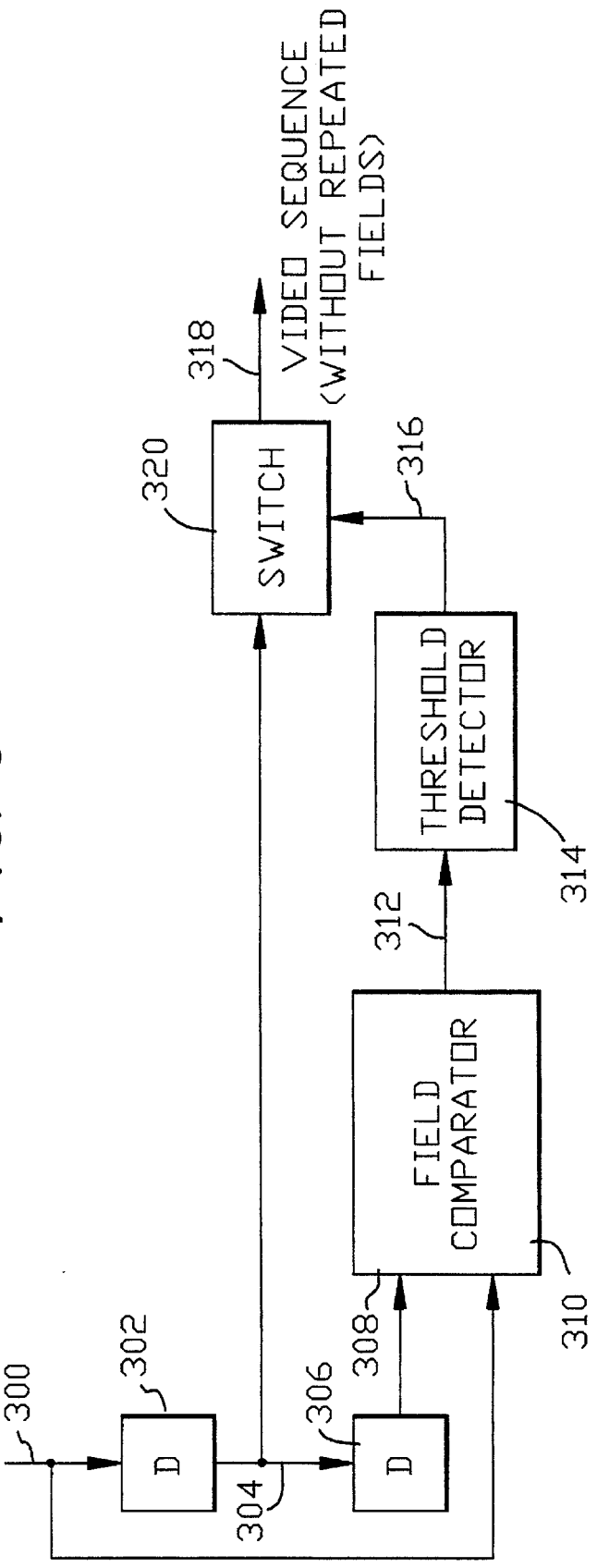
FIG. 3 shows a system for repeat field detection according to an embodiment of the present invention.

The present invention can be embodied as a software process executed by a general purpose computer or in specialized hardware logic. A complete system is shown in FIG. 3.

A video sequence 300 is input to the system one field at a time. Delay logic (referred to as delays) 302, 306, denoted by D, are used to obtain a delayed version of the input video sequence. The delays D represent storage in the systems memory for one field time (e.g. 1/60th of a second). Thus, the input of each D appears at the output of that D after exactly one field time. video sequence 300 is provided to the input of the first delay 302. The output 304 of the first delay 302 is the input video sequence 300 delayed by one field time. This output is fed to the input of the second delay 306. The output 308 of the second delay 306 and the input video sequence 300 are fed to a Field Comparator 310. The Field Comparator, which will be described in more detail, computes an inter-field parameter 312 and passes it on to a Threshold Detector 314. The Threshold Detector 314 determines whether the most recent field received at input 300 is a repeated field. A signal 316 indicating the result of this determination is sent to a Switch 320. If a repeated field is indicated by the signal 316, then the Switch 320 does not produces any new data on its output 318. If a repeated field is not indicated by the signal 316, then the field available on input 304 is copied to the output.

As mentioned above, Field Comparator 310 is used to compute the inter-field parameter. The current field is subtracted from the previous field of same parity on a pixel by pixel basis, and the absolute value of each pixel difference is computed. The absolute differences corresponding to each line are filtered with a first order recursive filter. For each line, the maximum of the output of the recursive filter is determined, yielding one number for each line. These numbers are then sent through a second first order recursive, and the inter-field parameter is computed as the maximum output of the second recursive filter. It should be understood that other types of filters could be used instead of the first order recursive filters.

Figure 1:
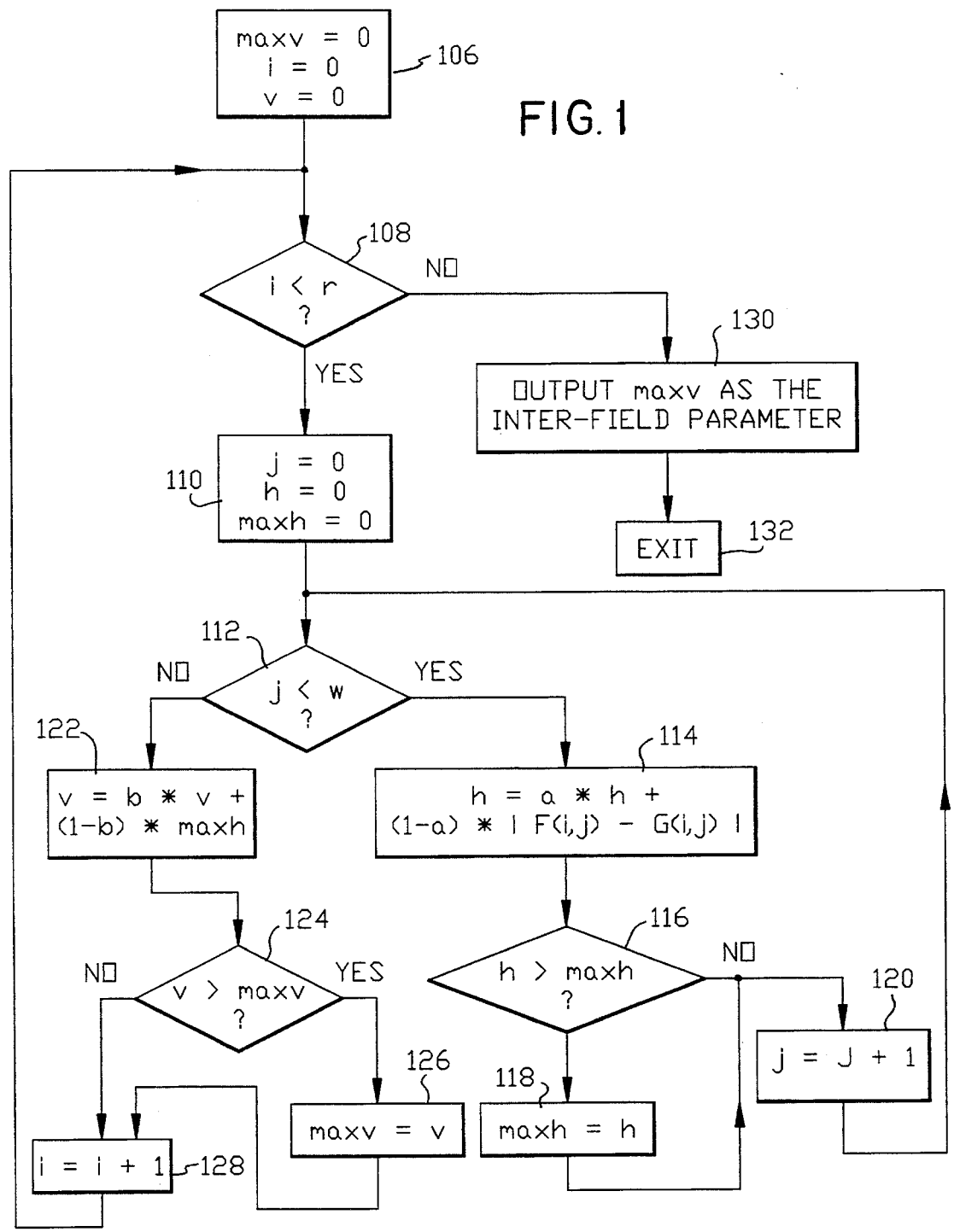
FIG. 1 is a flow chart of the operation of the Field Comparator of FIG. 3.

The operation of the field comparator is described in more detail with reference to FIG. 1. The Field Comparator 310 uses two constants a and b which parameterize the recursive filters. There is some flexibility for in choosing these constants. For example, both a and b can be set to ¼. Suppose that each field has r lines, and c pixels per line. For a field F, denote by $F(i,j)$ the luminance value of its j-th pixel in the i-th line. In order to compute the inter-field parameter of fields F and G, variables i, v and maxv are set to zero in step 106 and the fields are processed line by line. In step 108, if i is less than r, then there are more field lines to process. In this case, variables j, h and maxh are set to zero in step 110. Now the pixels in the i-th row of fields F and G are processed one at a time. If j is less then w in step 112, then h is set equal to the a times h plus (1-a) times the absolute value of the difference between $F(i,j)$ and $G(i,j)$, i.e., $h = a * h + (1-a) * |F(i,j) - G(i,j)|$. If h is found to be larger than maxh in step 116, then in step 118, maxh is set equal to h. In either case, in step 120, j is incremented by 1 and the process reenters step 112.

If, in step 112, it is determined that j is not less than w, then execution proceeds to step 122. Here, v is set equal to b times v plus (1-b) times maxh, i.e., $v = b * v + (1-a) * maxh$. If v is found to be greater than maxv in step 124, then in step 126, maxv is set equal to v. In either case, in step 128, i is incremented by 1 and the process reenters step 108.

If step 108 determines that i is not less than r, then step 130 outputs maxv as the inter-field parameter 312. Finally, the process exits in step 132.

Figure 5:
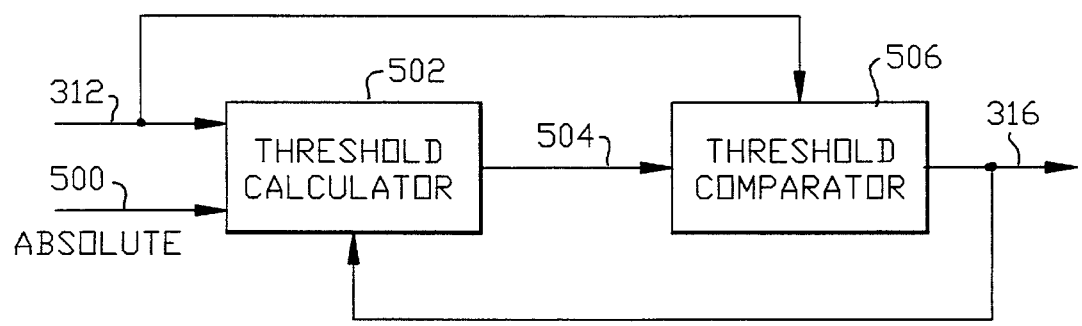
FIG. 5 is a more detailed diagram of the Threshold Detector of FIG. 3.

Once the inter-field parameter has been computed, it is used by the Threshold Detector 314 to determine if a pair of fields contains a repeated field. A block diagram of the Threshold Detector is shown in FIG. 5.

The threshold detector includes a Threshold Calculator 502 and a Threshold Comparator 506. The inter-field parameter 312, an absolute threshold 500, and the last repeated-field decision 316 are inputs to the Threshold Calculator 502. The Threshold Calculator computes a threshold value 504 and passes it on to the Threshold Comparator 506. The other input to the Threshold Comparator 506 is the inter-field parameter 312. Based on its earlier decisions and the two current inputs, the Threshold Camparator 506 determines if the most recent input 300 field is a repeated field and generates a signal 316 indicating the results of this determination on its output.

Figure 4:
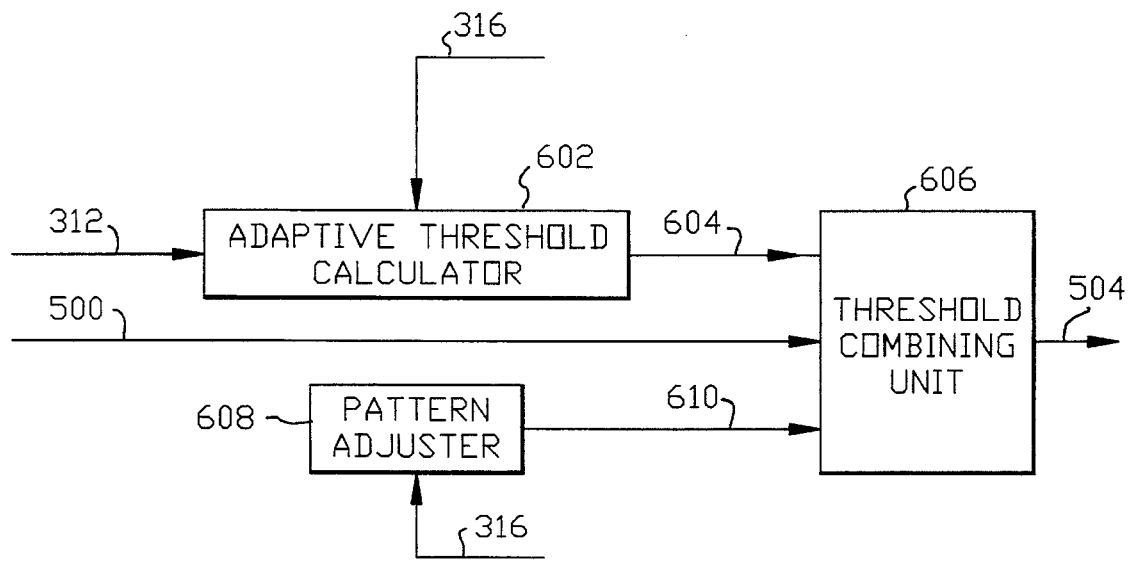
FIG. 4 is a more detailed diagram of the Threshold Calculator of FIG. 5.

The Threshold Calculator 502 is described in more detail in FIG. 4. The Threshold Calculator includes an Adaptive Threshold Calculator 602 which takes as inputs the current inter-field parameter 312 and the last repeat field decision 316. The Threshold Calculator 502 produces a new adaptive threshold 604 as an output. A Pattern Adjuster 608 takes the last repeat field decision 316 as the input and generates a weight 610 as an output. The Pattern Adjuster also stores the most recent repeat field decisions for future reference. This can be accomplished, for example, by storing the most recent (e.g. the last 4) decisions themselves or by storing data indicating the pattern of the most recent past decisions. The Pattern Adjuster checks the history of the repeat field decisions and determines if the next field is likely to be repeated field. This is accomplished by examining the pattern of the previous decisions and predicting the next decision as being consistent with the previous pattern (which is assumed to be periodic). The output 610 of the pattern adjuster is the predicted state of the field and a threshold adjustment factor indicating the certainty of the prediction. This, together with the current inter-field parameter 500 and the new adaptive threshold are input to a Threshold Combining Unit 606 which outputs an adjusted threshold 504.

An embodiment of the Threshold Detector will now be described by reference to FIG. 2. The flow-chart of FIG. 2 (which can be embodied in computer program code) also defines the operation of the components of FIGS. 4 and 5.

In step 200, variables last, skip, count, absolute, adaptive, alpha, beta and maxcount, respectively, are set to 0, 2, 0, 20, 20, 1.25, 0.25 and 3, respectively. The next inter-field parameter, fp, is read in step 201. In step 202 the variable skip is compared to 0. If skip is greater than 0, step 203 decrements skip, declares the current field a "new" field and returns to step 201. Otherwise, another variable t0 is set to the lesser of the variables adaptive and absolute in step 206. Variables count and maxcount are compared in step 208. If count is larger than maxcount, then variable last is compared to 1 in step 210. If last is found equal to 1, in step 212 the variable threshold is set to t0 times alpha; otherwise, in step 214 threshold is set to t0 divided by alpha. In either case, the process proceeds to step 218 after setting the value of threshold.

If, in step 208, count is determined to be less than or equal to maxcount, then threshold is set equal to t0 in step 216. Next, inter-field parameter fp is compared to threshold in step 218. If fp is less than or equal to threshold, then step 220 compares variable last to 0. If last does not equal zero, then count is set to zero in step 222; otherwise, count is incremented by one in step 224. Then, in step 226, last is set to one, and the current field is declared to be a repeated field. The process then proceeds to step 236.

If fp is greater than threshold in step 218, then step 228 compares variable last to 0. If last does not equal zero, then count is set to zero in step 232; otherwise, count is incremented by one in step 230. Then, in step 234, last is set to zero, and the next field is declared to be a repeated field. The process then proceeds to step 236.

In step 236, variable adaptive is updated to equal beta times the larger of fp and coef, and then, coef is set equal to fp. The process is then reentered at step 204.

It should be understood that sample values have been given for many of the constants and for initializing several variables. It should be understood that other choices can be made.

A alternate, hardware logic embodiment of the invention will now be described by reference to FIGS. 6 and 7. This embodiment is simpler then the previously described embodiment, and is therefore well suited for a real-time hardware system. In particular, the alternate embodiment differs from the first embodiment as described below.

In the alternate embodiment:

1. the current field and the previous field of the same parity are processed in a one-dimensional manner; the Field Comparator 310 reads in the pixels from left to write and the top to bottom, but does not distinguish between which row each pixel is on. The pixel values for the previous field are subtracted from the pixel values for the current field, and the absolute value of each difference is computed. These absolute differences are sent to a first order recursive filter with parameter ¼;

2. When a repeat field is detected, the next field that we check to be a repeat is the fifth field from the current field; this is equivalent to setting skip equal to 4 (rather then 2) in box 226 of FIG. 2.

3. alpha is set to 1; i.e., the Pattern Adjuster 608 is eliminated; and, 4. adaptive is updated only when a repeat field is detected.

Figure 6A:
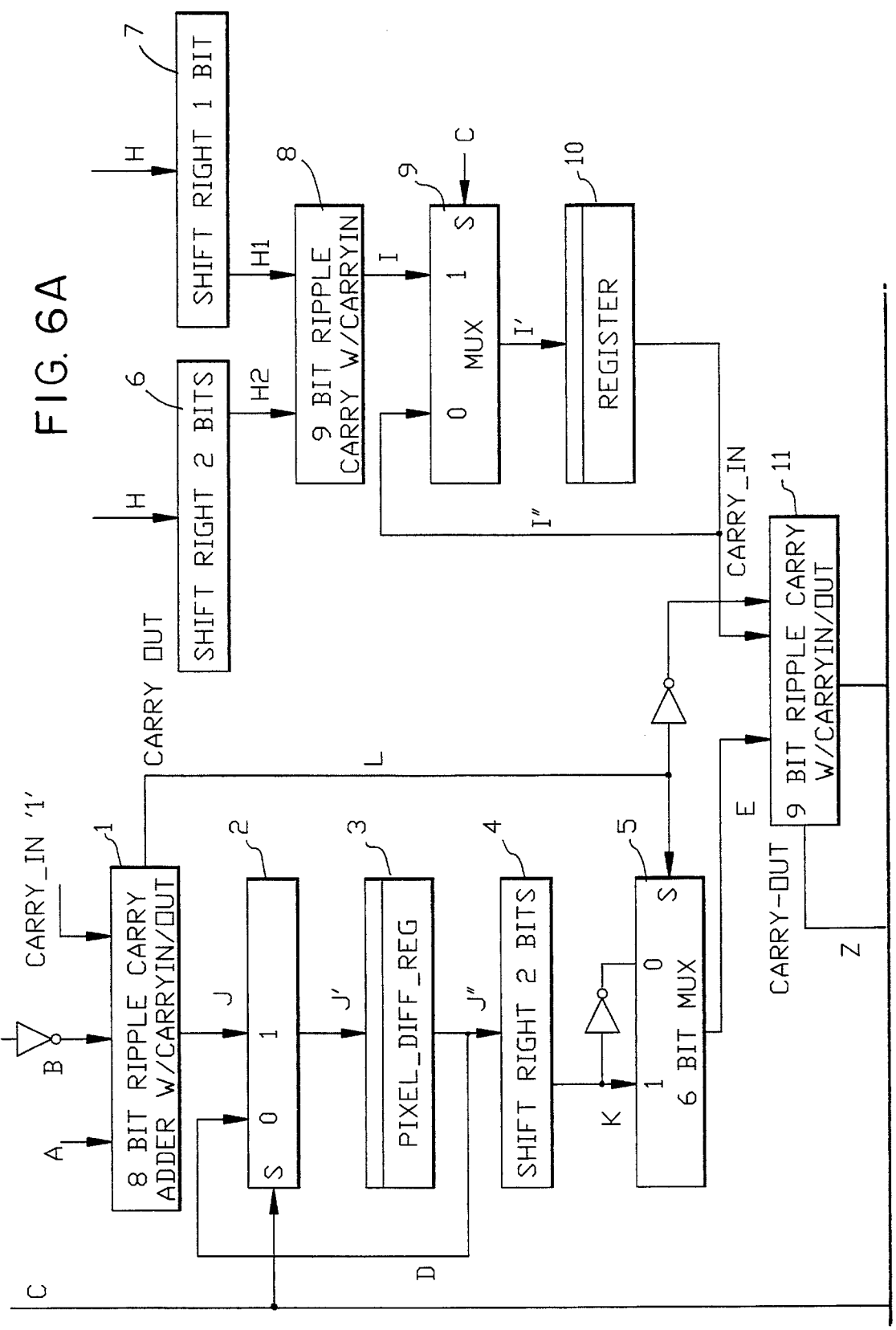
FIG. 6 shows the hardware logic for a Field Comparator according to an alternate embodiment of the present invention; and, FIG. 7 shows the hardware logic for a Threshold Detector according to an alternate embodiment of the present invention.

FIG. 6, shows a field comparator for the alternate embodiment. Each pixel B from the previous field of the same parity is fetched from a Frame Store memory (not shown). The absolute value of the difference of the new pixel A and the previous field pixel B is found by two's complement addition of the new pixel A and the inverse of the previous field pixel B accomplished by a ripple carry adder (with carry in/out) 1 having its carry set to 1. The ripple carry adder produces a carry out signal L. The difference J (output from the ripple carry adder 1) is sent to a multiplexor 2. A pixel difference register 3 is loaded with a value J' which is equal to its current value (when an input timing signal C is equal to 0) or the difference J (when the input timing signal C is equal to 1). This causes a new difference signal J" to be latched into the pixel difference register when timing signal C indicates that inputs A and B are valid (i.e. C=1). The pixel difference signal J" is then divided by 4 by a shifter 4 which shifts J" to the right by two bit positions to produce an output K. K and its inverse are fed to a multiplexor 5 which produces and output E. The multiplexor sets the output E as equal to K (E=K) when L=1 1 and to the inverse of K when L=0.

A signal H indicates the state of the first order recursive filter. The generation of signal H will be described later. H is fed into two shifters 6,7 which produce signals H2 and H1 which are, respectively, H shifted to the right by 2 bit positions and H shifted to the right by one bit position. H2 and H1 are fed to a ripple carry adder 8 which produces a sum I. The sum I (output from the ripple carry adder 8) is sent to a multiplexor 9. A register 10 is loaded with a value I' which is equal to its current value (when the input timing signal C is equal to 0) or the sum I (when the input timing signal C is equal to 1). This causes a new sum I" to be latched into the register 10 when timing signal C indicates that input H is valid (i.e. C=1).

A ripple carry adder 11 is fed with signals E and I" and a carry in which is the inverse of the carry out signal L. The ripple carry adder 11 produces a sum F and a carry out Z. The sum F is sent to a multiplexor 12. A register 13 is loaded with a value F' which is equal to its current value (when the input timing signal C is equal to 0) or the sum F (when the input timing signal C is equal to 1). This causes a new sum F" to be latched into the register 17 when timing signal C indicates that inputs E and I" are valid (i.e. C=1).

A multiplexor 14 is fed with a signal G equal to 255 and the signal F". The output H of the multiplexor 14 is equal to G if the carryout signal Z is equal to one and is equal to F" if Z equals 0.

The register 20 stores the previously computed maximum output of the recursive filter. The current output of the recursive filter, signal F", is loaded into the register 17. The ripple carry adder 18 receives as input the inverse of a signal M, which is the output of register 17, and the signal N', which is the output of register 20. The carryout of the adder 18, is signal Y. The multiplexor 19 receives as inputs M and N', and produces an output signal N equal to M if Y is equal to 0 and equal to N if Y is equal to 1; i.e., N is the maximum of M and N'. The signal N overwrites the contents of register 20.

In FIG. 7 shows a Threshold Detector for the alternate embodiment. The adaptive threshold is stored in a register 23 and the absolute threshold is stored in a register 24.

The signal N' is fed to the Threshold Detector whenever a new field is checked to match a previous field; i.e., 4 field times after the last check for a repeat field resulted in the determination that the field was repeated and 1 field time after the last check for a repeat field resulted in the determination that the field was not a repeat field.

The output of the register 24 is the signal X. The signal X and the inverse of the signal N' are fed to a ripple carry adder 25 with carryout signal Q.

The output of register 23 is the signal P'. The signal P' and the inverse of the signal N' are fed to a ripple carry adder 26 with carryout R.

The input signal W is equal to 1 if the last time that a field was checked to be a repeat field it was determined that field was not a repeat field; otherwise it is equal to 0. The signal N' is fed into the shifter 21. The shifter 21 produces a signal O equal to N' right shifted by two bit positions. The signals O and P' are sent to a multiplexor 22, which produces an output signal P. The signal P is equal to the signal O if the signal W is equal to 1, and it is equal to the signal P' if W is equal to 0. The signal P then replace the contents of register 23 (to become the adaptive threshold for the next compare.)

If both carryouts R and Q are equal to one then the current field is declared repeated; otherwise it is declared not repeated.

Now that the invention has been described by way of the preferred embodiments, various modifications and improvements will occur to those of skill in the art. Thus, it should be understood that the preferred embodiment has been provided as an example and not as a limitation. The scope of the invention is defined by the appended claims.

We claim:

1. A method for detecting repeated fields in a video sequence, comprising the steps of:

examining a given field of a current frame in a video sequence and a previously occurring field of the same parity in the video sequence;

computing a measure of the difference between the given field and the previously occurring field;

comparing the measure to a threshold; and when it is determined that the measure is below the threshold generating a signal indicating that the given field is a repeat of the previously occurring field;

based on a result of the comparing, selecting another pair of fields for examination.

2. The method of claim 1 comprising the further step of modifying the threshold as a function of the difference.

3. The method of claim 1 comprising the further step of varying the threshold as a function of detected differences in fields of the video sequence.

4. The method of claim 1 wherein only a subset of fields of the video sequence are examined for repetition.

5. The method of claim 1 wherein the measure of the difference is computed by using a single recursive filter.

6. The method of claim 1 wherein the selecting another pair of fields for examination comprises the step skipping the examination of at least the sequentially next field in the video sequence when the given field is a repeat of the previously occurring field.

7. The method of claim 1 wherein the selecting another pair of fields for examination comprises the step skipping the examination of at least the sequentially next two fields in the video sequence when the given field is a repeat of the previously occurring field and otherwise examining the sequentially next field in the video sequence.

8. A method for detecting repeated fields in a video sequence, comprising the steps of:

examining a first field of a current frame in a video sequence and a previously occurring field of the same parity in the video sequence;

computing a measure of the difference between the first field and the previously occurring field;

comparing the measure to a threshold; and when it is determined that the measure is below the threshold generating a signal indicating that the first field is a repeat of the previously occurring field;

wherein in response to the signal, the immediately next two fields in the video sequence are not examined.

9. A system for detecting repeated fields in a video sequence, comprising:

delay logic having an input connected to receive at least a portion of the video sequence;

a comparator connected to receive a current field of the video sequence and a previous field having the same parity provided by the delay logic;

a threshold detector connected to receive a difference signal output by the comparator, the threshold detector being connected to generate a signal indicative of whether the difference signal exceeds a given threshold;

a switch responsive to the signal, connected to receive and output a delayed version of the video sequence from the delay logic and, means responsive to a given state of the signal, for causing the comparator to skip comparison of at least one pair of fields in the video sequence.

10. The system of claim 9 comprising threshold calculation logic for modifying the threshold in as a function of the signal.

11. The system of claim 10 wherein the threshold calculation logic includes means for tracking differences between earlier fields and previous occurrences of the signal and for modifying the threshold responsive to the differences and the previous occurrences.

12. The system of claim 9 wherein the comparator includes a single recursive filter.

\* \* \* \* \*